Dec. 23, 1930.  G. H. SNYDER  1,785,822
CIGAR MACHINE
Original Filed Jan. 25, 1924   8 Sheets-Sheet 1
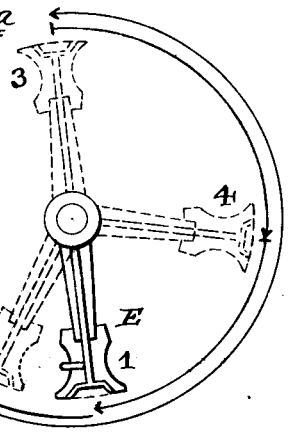
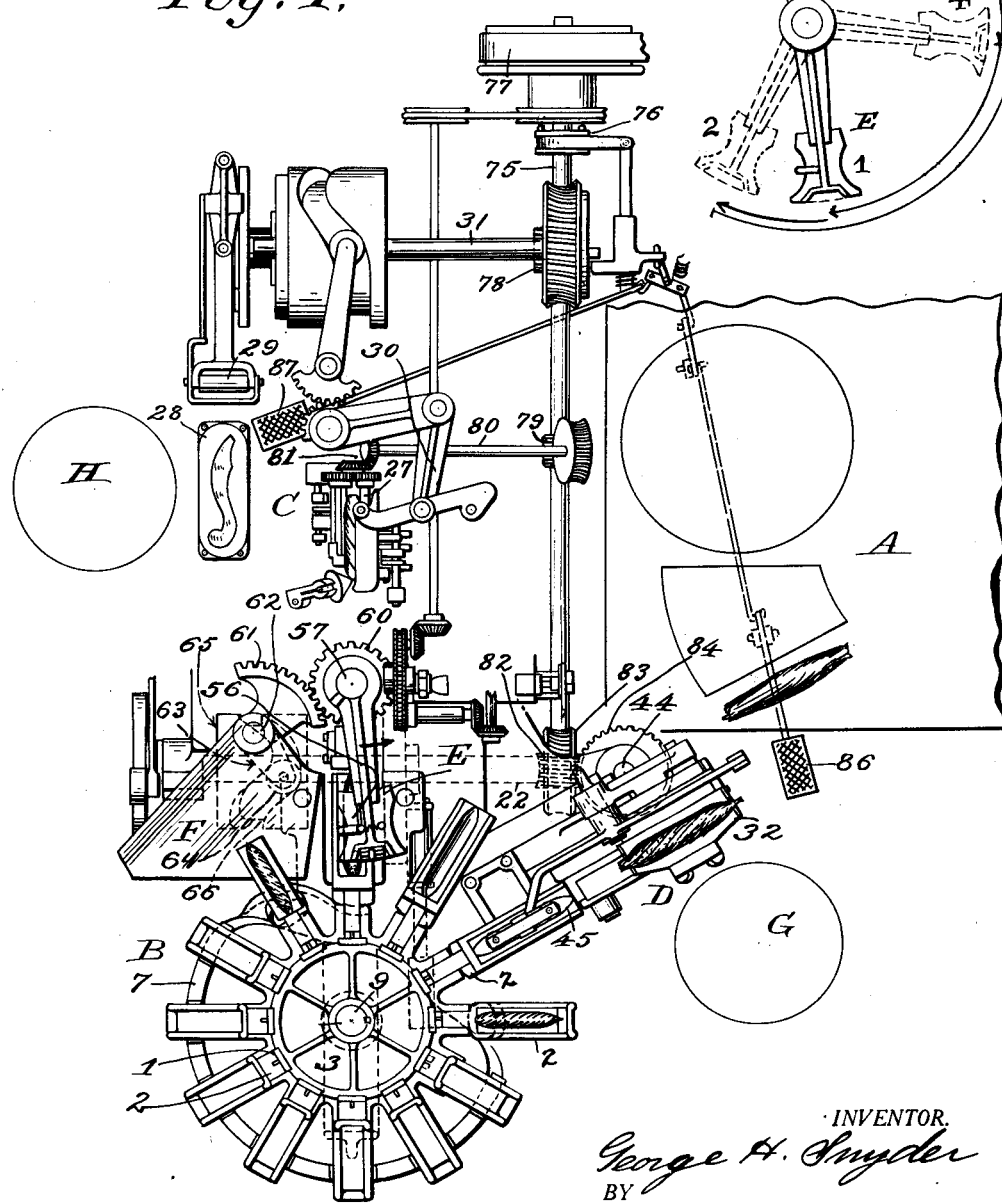
INVENTOR.
George H. Snyder
BY Sydney Prescott
ATTORNEY.

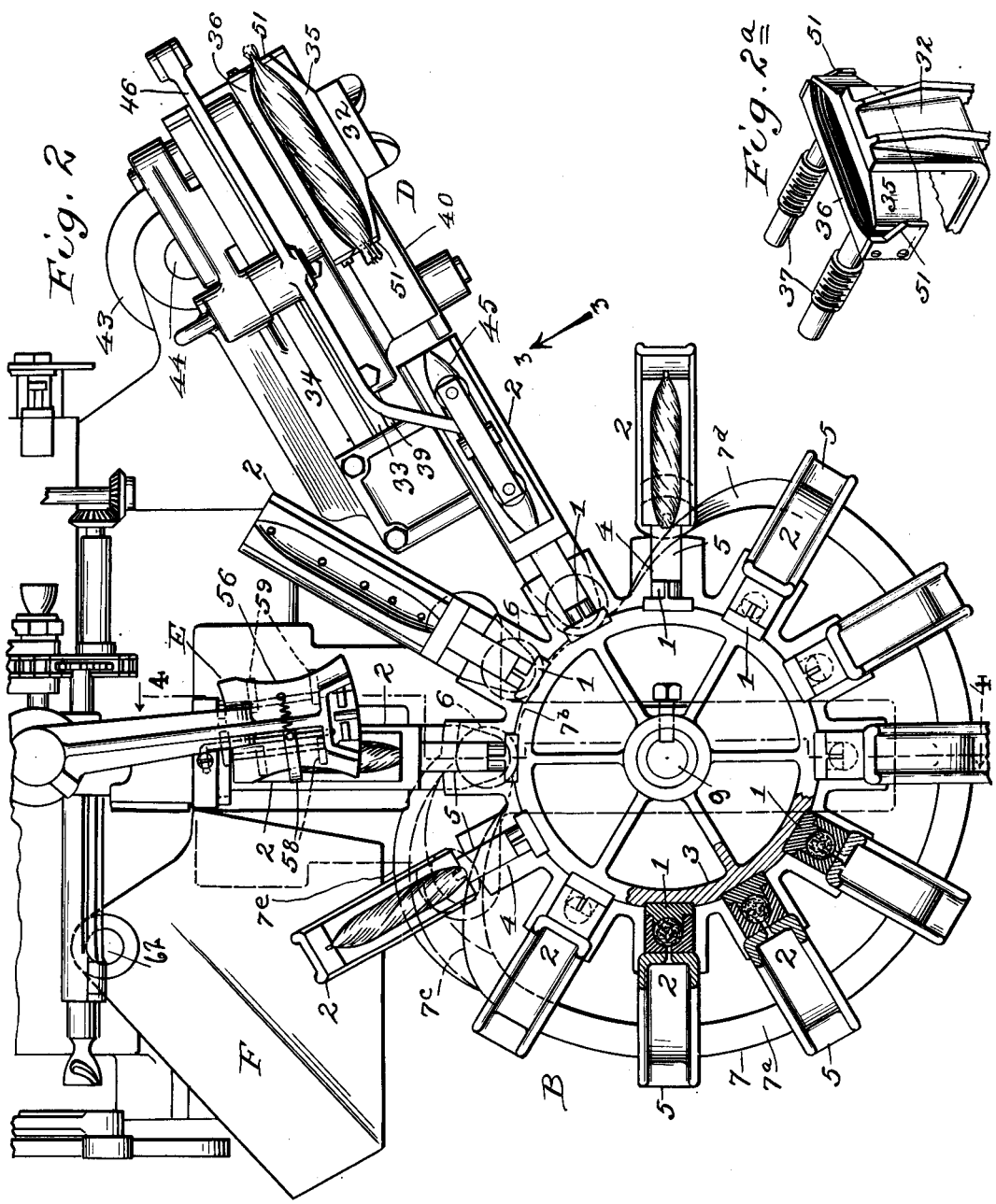

Dec. 23, 1930.  G. H. SNYDER  1,785,822
CIGAR MACHINE
Original Filed Jan. 25, 1924  8 Sheets-Sheet 3
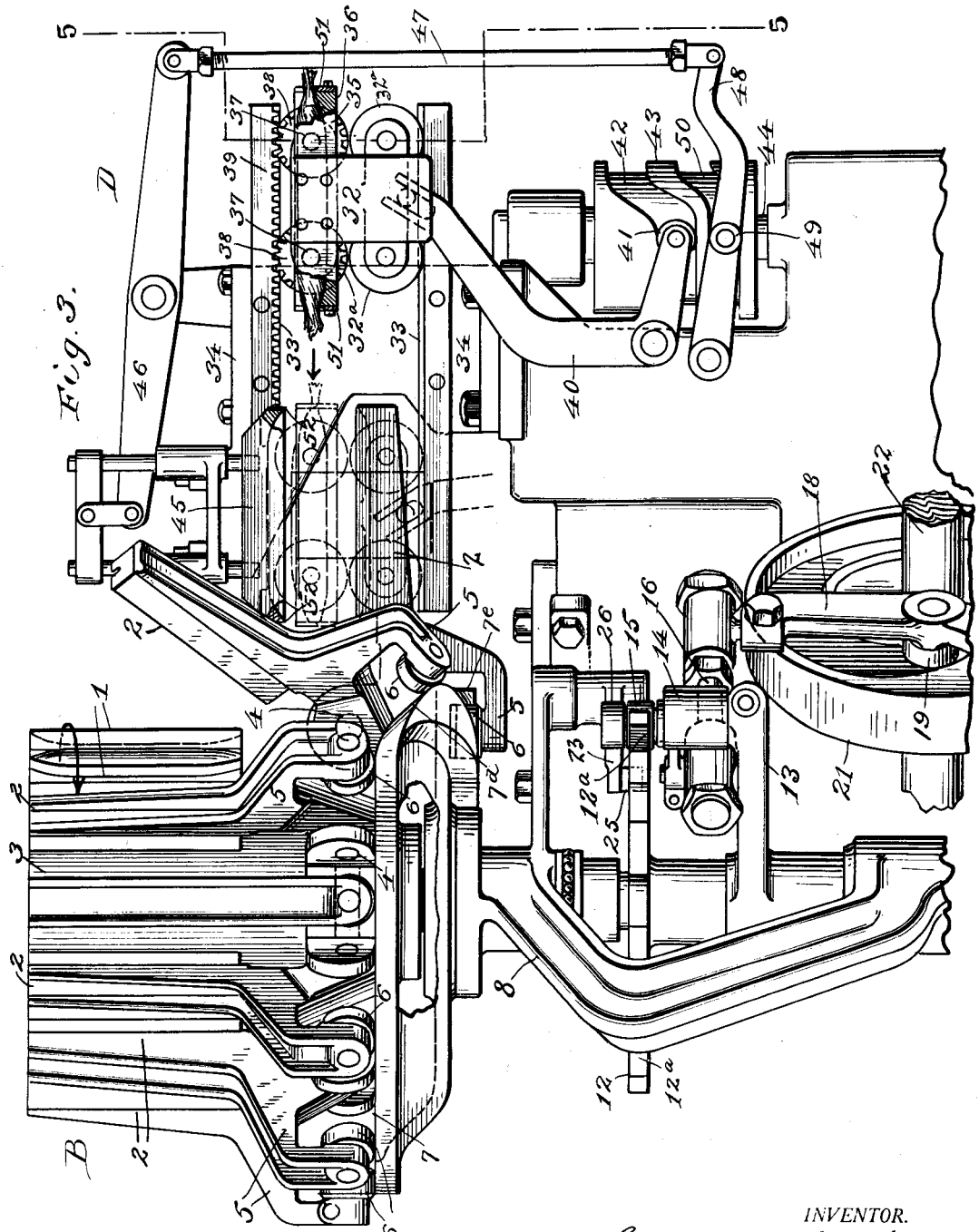

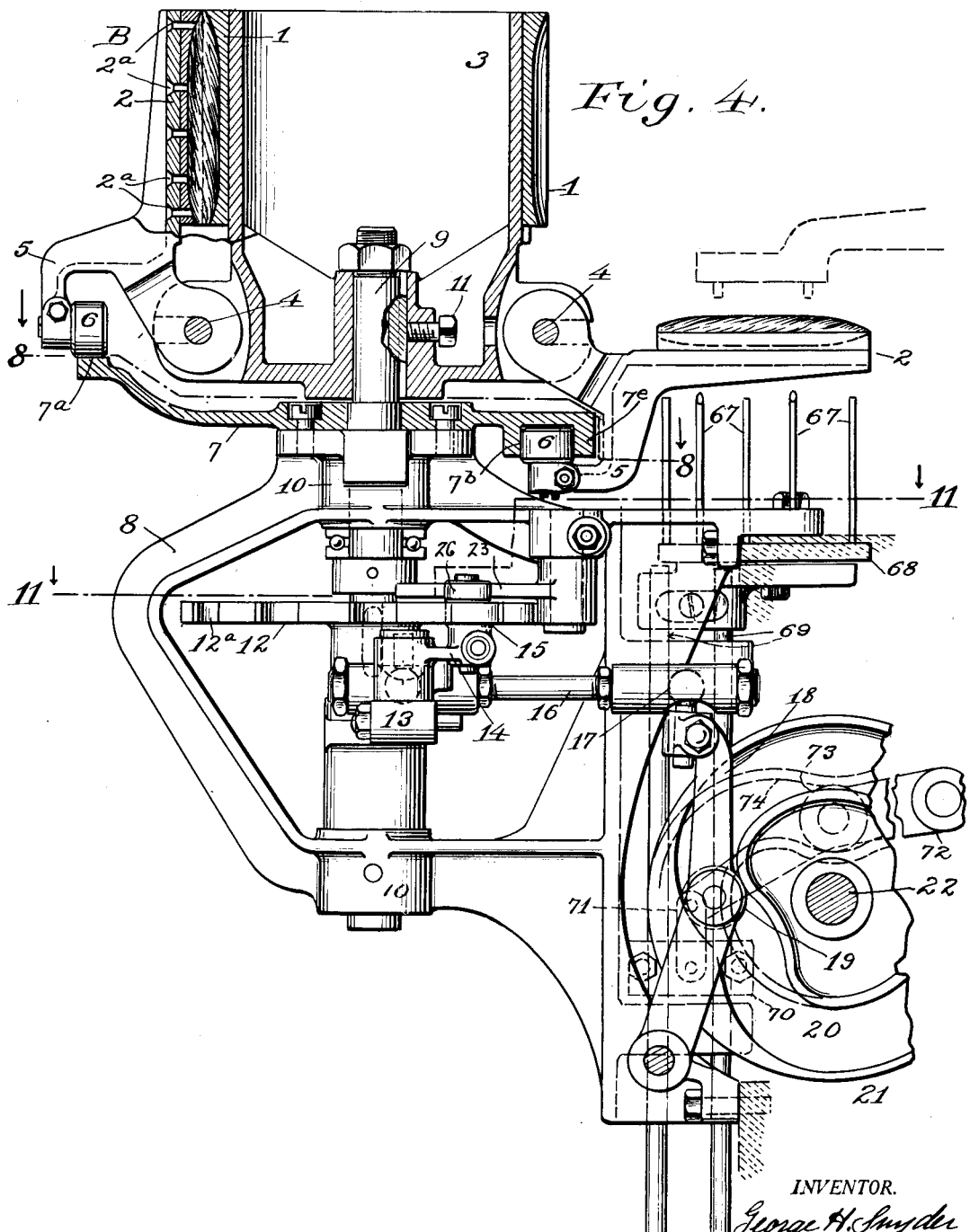

Dec. 23, 1930.   G. H. SNYDER   1,785,822
CIGAR MACHINE
Original Filed Jan. 25, 1924   8 Sheets-Sheet 5
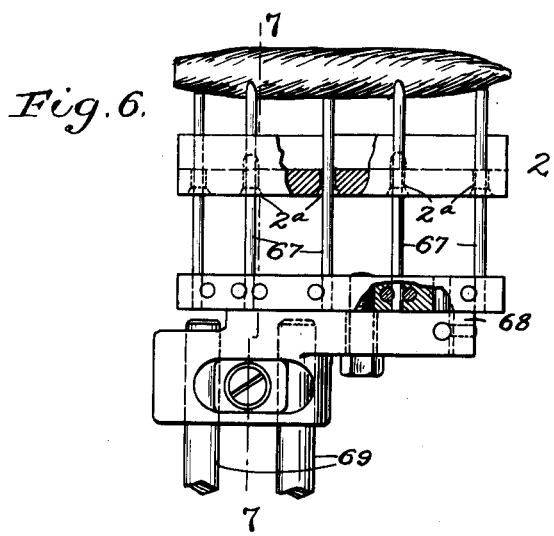
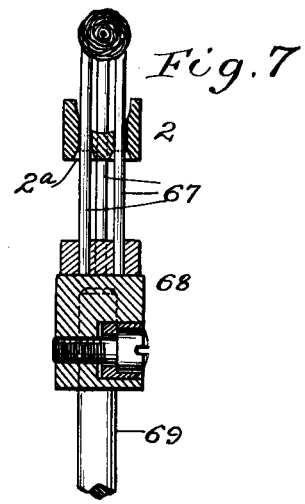
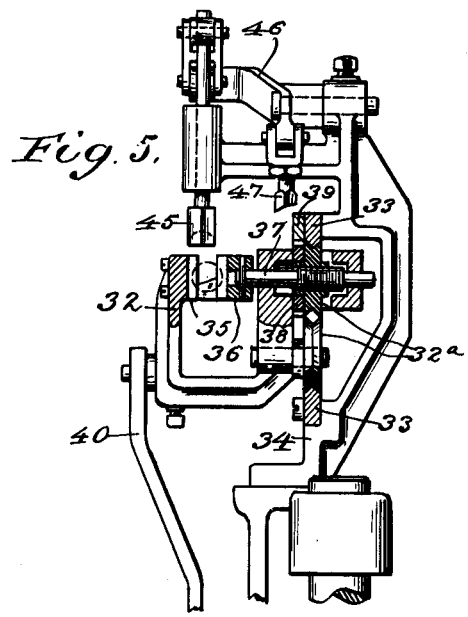
INVENTOR
George H. Snyder
BY
Sydney J. Prescott
ATTORNEY Dec. 23, 1930.  G. H. SNYDER  1,785,822
CIGAR MACHINE
Original Filed Jan. 25, 1924  8 Sheets-Sheet 6

INVENTOR
George H. Snyder
BY
Sydney Prescott
ATTORNEY

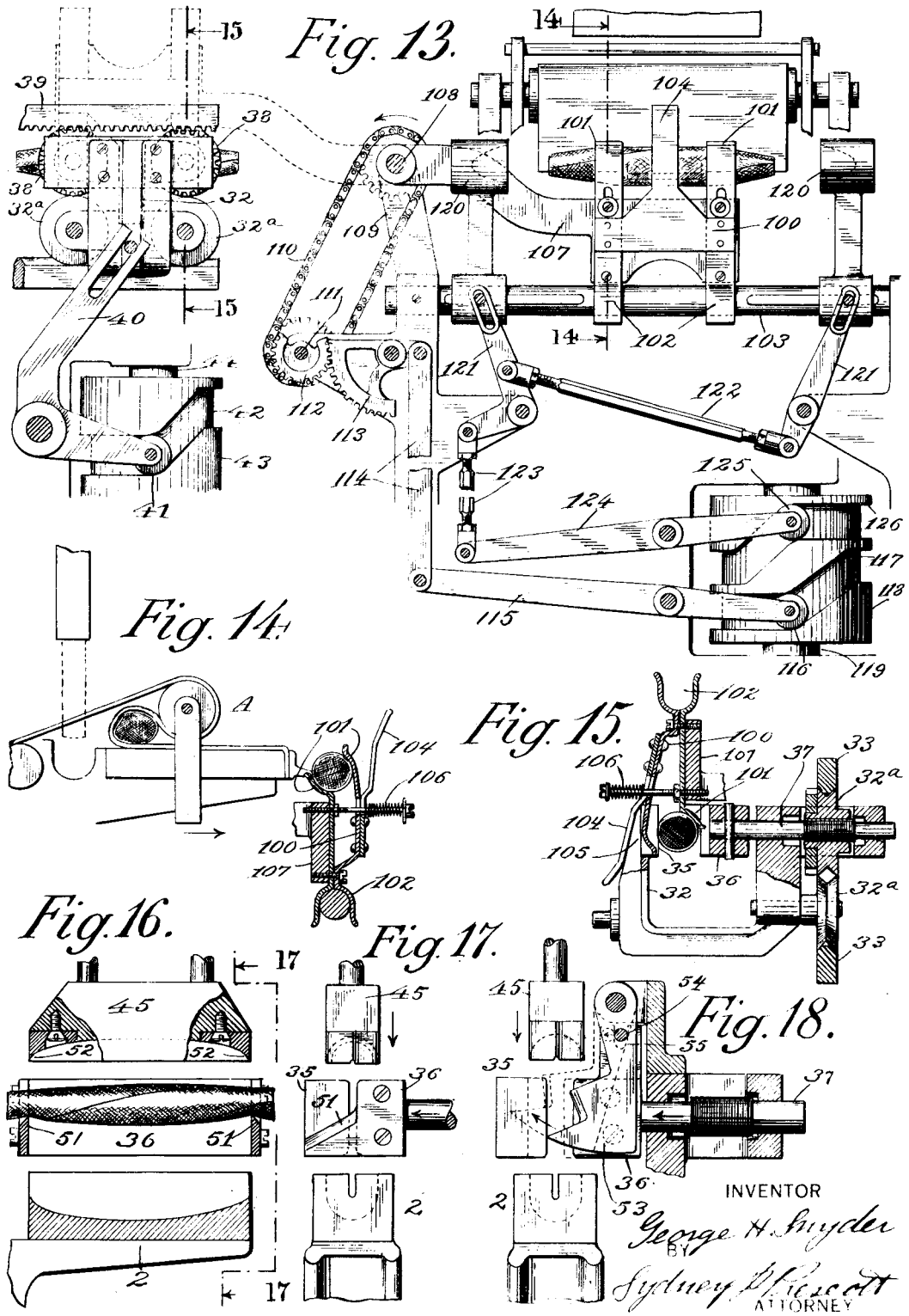

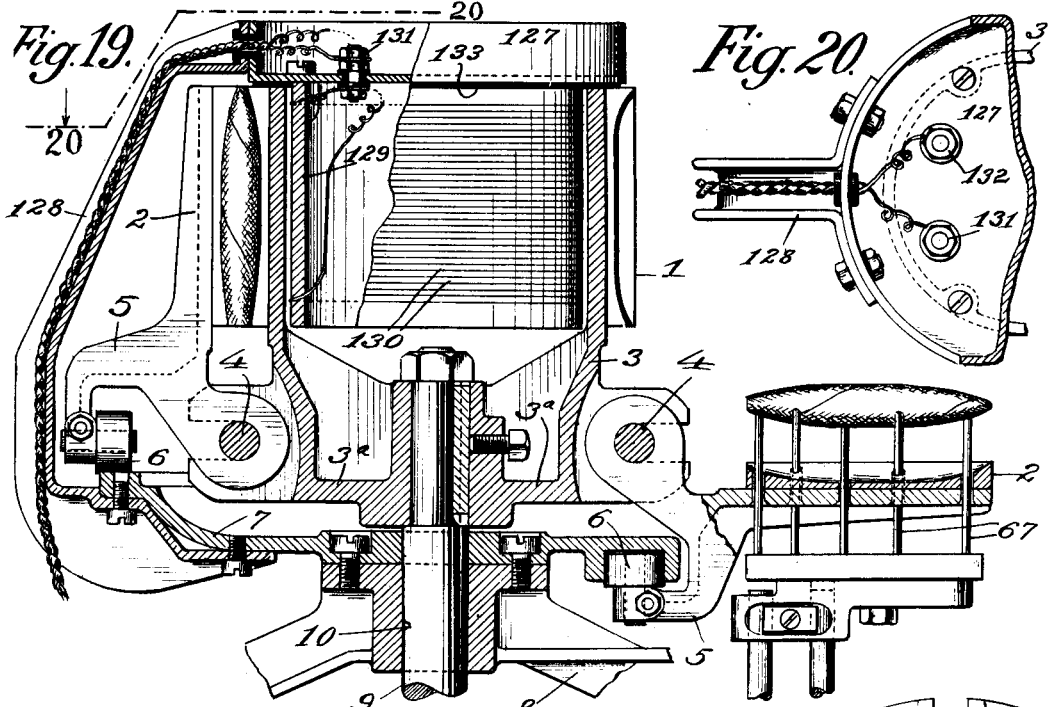
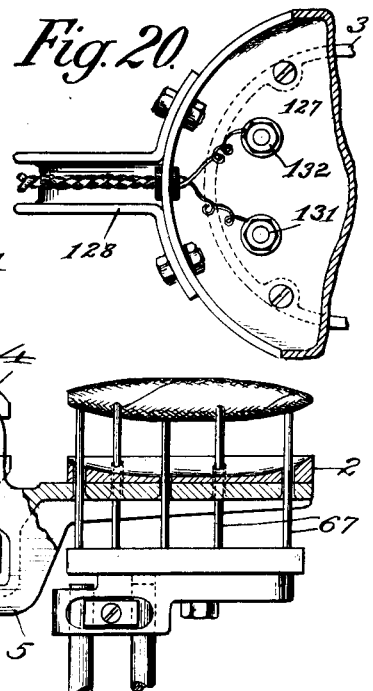
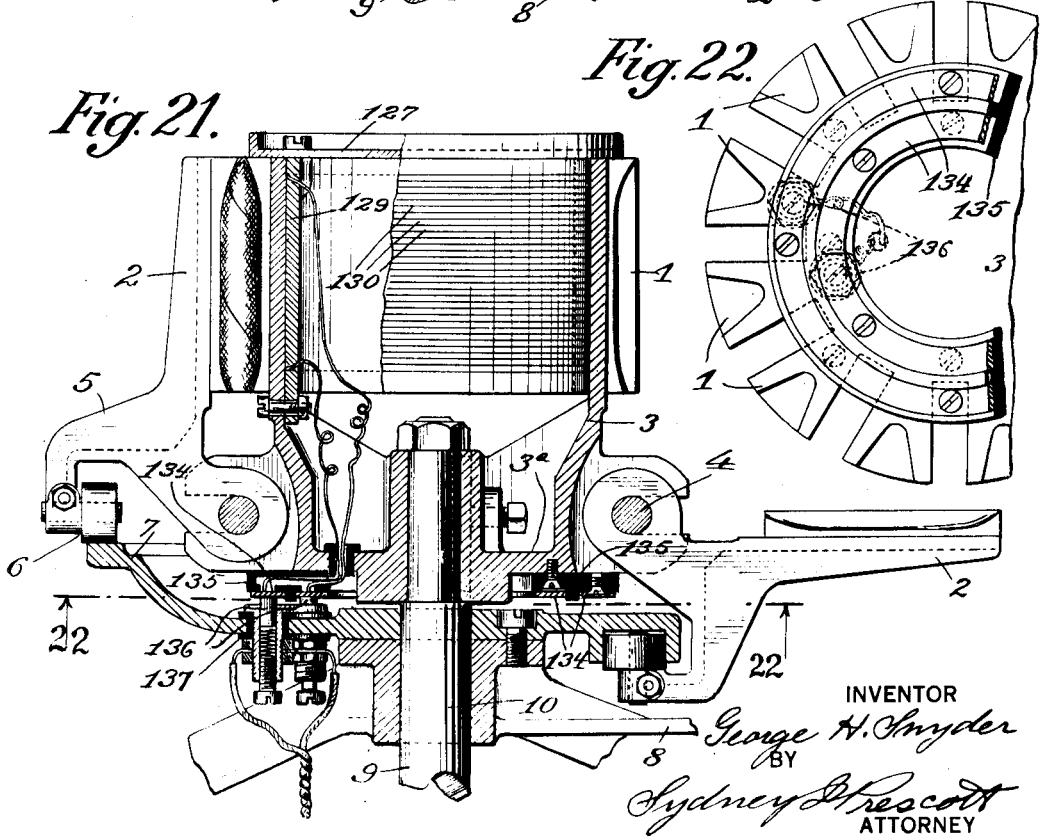
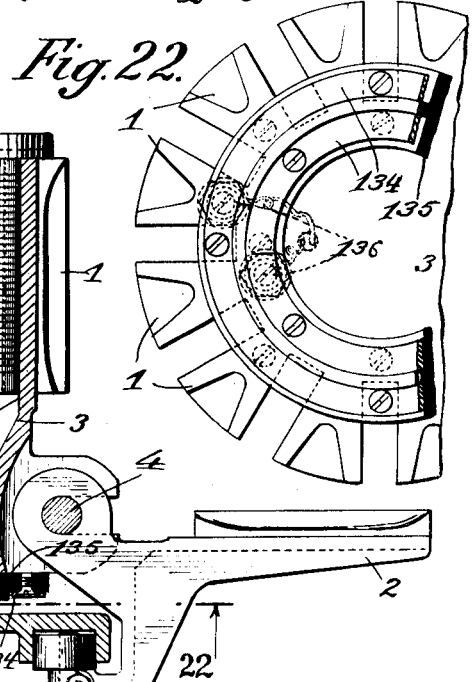

Patented Dec. 23, 1930

1,785,822

UNITED STATES PATENT OFFICE

GEORGE H. SNYDER, OF BROOKLYN, NEW YORK, ASSIGNOR TO INTERNATIONAL CIGAR MACHINERY COMPANY, OF NEW YORK, N. Y., A CORPORATION OF NEW JERSEY

CIGAR MACHINE

Application filed January 25, 1924, Serial No. 688,491. Renewed June 27, 1928.

This invention relates to an improved cigar machine, particularly designed, adapted and used for making cigars of a new type which have not yet acquired a definite trade name.

In the machine manufacture of "fresh work" or "fresh bunch" cigars, a sufficient quantity of filler is enclosed in a binder to form a properly sized bunch. The bunch so formed is then manipulated to evenly distribute the filler within the binder, or, in other words, to work out any lumps of filler due to imperfect feeding during the bunch forming operation. Then, the ends of the bunch are shaped or compressed to give them their permanent conical form and the bunch as a whole its proper contour, the mid-section of the bunch being left as originally formed. Then, the bunch so shaped is trimmed to proper length. Then, the shaped and trimmed bunch is enclosed within a wrapper. Then, the wrapped bunch which has become a cigar, is trimmed and in some instances otherwise finished, as by re-rolling and flag smoothing. These are the steps involved in the machine manufacture of fresh bunch cigars.

In the machine manufacture of "molded bunch" cigars, a sufficient quantity of filler is enclosed within a binder to form a greatly oversized bunch. The bunch so formed is then subjected to pressure in a mold having an internal contour corresponding to the external contour of the desired bunch, for a sufficient time and under sufficient pressure to reduce the greatly oversized bunch to its proper size, to destroy the natural resiliency of the tobacco and to give the bunch permanent form. This inevitably and unavoidably results in closure of some of the draft passages and the formation of exterior ridges along the bunch at the meeting lines of the mold sections. These are the steps involved in the machine manufacture of molded cigars.

In the manufacture of the present product, however, a sufficient quantity of filler is enclosed within a binder to form a slightly oversized bunch. The bunch so formed is then concentrated, its component parts being gathered in towards the axis of the bunch, sufficiently to reduce it to its proper size, to cause its component parts to adhere one to another and thus produce a temporary set, but insufficiently to close any of the draft passages or to produce exterior ridges along the bunch. The concentrated bunch thus produced is then immediately wrapped. These are the steps involved in the machine manufacture of the present product.

By comparison of the three sets of steps, it will be seen that the steps involved in the machine manufacture of fresh bunch cigars, molded bunch cigars, and concentrated bunch cigars, are essentially different; and that the method employed in the manufacture of one kind will not and cannot result in the production of either of the other kinds. The proximate results attained, therefore, materially differ. The fresh bunch cigar has an uncompressed and unconcentrated mid-section and compressed or shaped ends. The molded bunch cigar is compressed throughout its length. The new product is nowhere compressed, but is concentrated throughout its length. The ultimate results, therefore, materially differ.

It may be here remarked that "immediately", as used herein, means without appreciable delay, particularly before a change occurs in the condition of the tobacco; while "concentration" does not mean compression which destroys the resiliency of the tobacco, or gives a permanent set to the bunch, or closes the draft passages or some of them, or forms exterior ridges, but it means a slight gathering of the filler parts towards the axis of the bunch to cause them to adhere one to another, and the bunch to acquire a temporary set, without production of the undesirable effects resulting from compression.

The new product is variously referred to by cigar manufacturers as a "short-filler cigar", a "soft-bunch cigar", or a "fresh-scrap cigar"; but it is thought that concentrated bunch cigar, as the product is designated herein, more accurately distinguishes the new product from the old.

The main object of the present invention is the production of a machine capable of manufacturing the new product. The machine illustrated in the drawings is designed to be used primarily for making concentrated bunch cigars, whether the filler consists of long or scrap tobacco. The machine is so constituted that wrappers may now be applied to all cigar bunches immediately after the latter are formed, without regard to the filler material, and while the tobacco is still in a soft and pliable condition; thus eliminating the necessity heretofore existing for molding a very large number of cigars at a cost now completely wiped out. With this and other objects not specifically mentioned in view, the invention consists in certain combinations and constructions which will be hereinafter fully described and then specifically set forth in the claims hereunto appended.

In the accompanying drawings which form a part of this specification and in which like characters of reference indicate the same or like parts:

Fig. 1 is a plan view, in the nature of a diagram, of a machine constructed in accordance with the invention.

Fig. 1ª is a diagram showing the operation of the carrier which transfers the cigar bunches from the concentrating apparatus to the wrapping mechanism.

Fig. 2 is a plan view, on an enlarged scale, of the bunch concentrating apparatus and the cooperating transfer mechanism.

Fig. 2ª is a perspective view of the carrier proper which supplies the cigar bunches to the concentrating apparatus.

Fig. 3 is an elevation, looking in the direction of the arrow 3—3 of Fig. 2.

Fig. 4 is a vertical section taken on the line 4—4 of Fig. 2.

Fig. 5 is a vertical section taken on the line 5—5 of Fig. 3.

Fig. 6 is a side view, partly broken away, of the ejector which moves the cigar bunches from the successive concentrators and showing the ejector as thrust upwardly through one of the concentrator sections.

Fig. 7 is a vertical section taken on the line 7—7 of Fig. 6.

Fig. 13 is a front elevation of an automatic transfer device for transporting the cigar bunches from the bunch forming mechanism to the carrier which transports them to the bunch concentrating apparatus.

Fig. 14 is a section taken on the line 14—14 of Fig. 13.

Fig. 15 is a section taken on the line 15—15 of Fig. 13, but showing the transfer device in full lines.

Fig. 16 is a vertical section taken through the bunch carrier, the cooperating ejector, and one of the concentrator sections, showing in particular the bunch trimming knives.

Fig. 17 is an end view of the parts shown in Fig. 16, looking in the direction of the arrows 17—17.

Fig. 18 is a similar view, with the carrier partly in section, showing a modified bunch trimming arrangement.

Fig. 19 is a section similar to Fig. 4 and showing the concentrator turret as equipped with a stationary heating unit.

Fig. 20 is a plan view looking in the direction of the arrows 20—20.

Fig. 21 is a view similar to Fig. 19 showing the concentrator turret as equipped with a rotating heating unit.

Fig. 22 is a section taken on the line 22—22 of Fig. 21.

Figures 8, 9, 10:
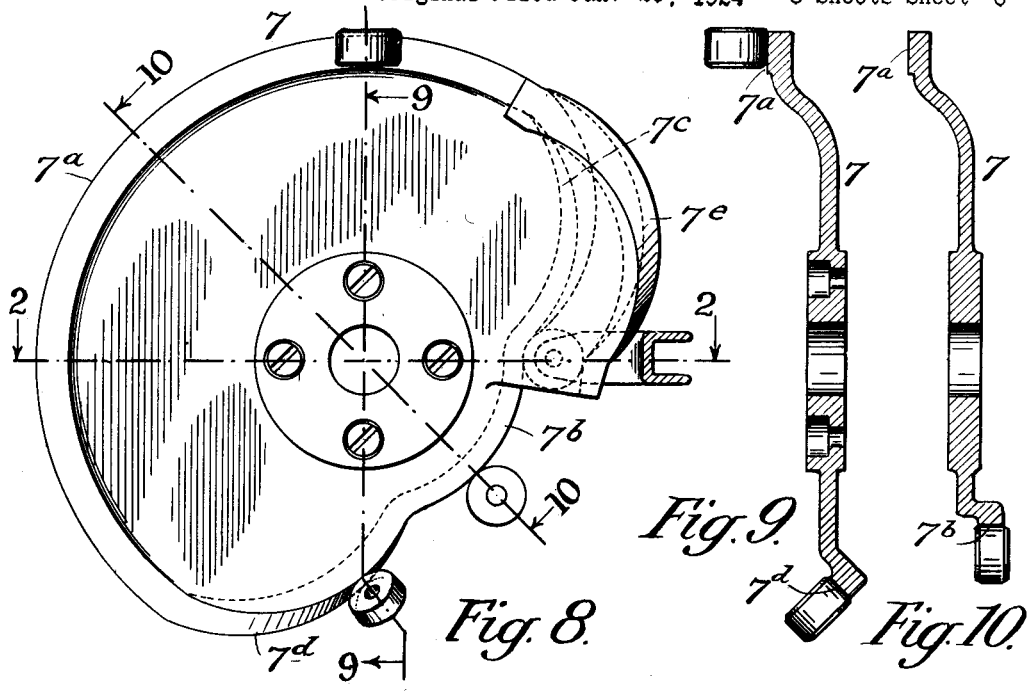
Fig. 8 is a section taken on the line 8—8 of Fig. 4.
Fig. 9 is a section taken on the line 9—9 of Fig. 8.
Fig. 10 is a section taken on the line 10—10 of Fig. 8.

In carrying the invention into effect, there is provided means for concentrating a bunch to give it temporary set without closing draft passages or producing exterior ridges, and means associated with said concentrating means for immediately applying a wrapper to the concentrated bunch. In the best constructions contemplated, there is also provided means associated with said concentrating means for enclosing a sufficient quantity of filler within a binder to produce a slightly oversized bunch to be concentrated; bunch trimming means interposed between the enclosing means and the concentrating means; means whereby bunches are presented for inspection between the enclosing means and the concentrating means; means for transferring bunches from the enclosing means to the concentrating means; means for transporting bunches from the concentrating means to the wrapper applying means; means for delivering the wrapped bunches to final inspection position; and means for heating bunches in the concentrating means. All the above mentioned means and parts may be widely varied in construction within the scope of the claims, for the particular machine selected to illustrate the invention is but one of many possible concrete embodiments of the same. The invention, therefore is not to be restricted to the precise details of the machine shown and described. Furthermore, certain parts of the machine are capable of use independent of other parts, and such independent use is contemplated; and either long or short filler bunches may be made and concentrated in accordance with the invention.

Generally speaking, the improved machine selected to illustrate the invention comprises a bunch forming mechanism A, a bunch concentrating apparatus B, a wrapping mechanism C, and two transfer mechanisms D and E, the former acting to transfer the bunches from the bunch forming mechanism to the concentrating apparatus and the latter acting to transfer the bunches from the concentrating apparatus to the wrapping mechanism and the wrapped cigars from the wrapping mechanism to a suitable receptacle, such as the tray F. In practice, the services of two operators are required, one seated at G to serve the bunch forming mechanism A, and the other seated at H to serve the wrapping mechanism C. In this connection, it is pointed out that the bunch concentrating apparatus and the wrapping mechanism, as well as the two transfer mechanisms, are all operated in timed relation to one another, whereas the bunch forming mechanism is operated under the independent control of the operator seated at G, who is expected to place the cigar bunches by hand in the transfer mechanism D. This manual operation might be dispensed with (an automatic arrangement will later be described), but it is preferred in order to insure the proper selection and handling of the cigar bunches put through the machine.

The bunch forming mechanism A may be of any approved form, such as of the chianti belt type, its office being to measure off a charge of filler tobacco and enclose the same within a binder to form a slightly over-sized bunch. This type of bunch forming mechanism is so well known that it is deemed unnecessary to illustrate it in detail in the drawings. However, some of its details are shown in Figs. 13 and 14. The only way in which it is essentially different from such mechanisms for producing bunches to be molded, is in the size of the bunches produced—greatly oversized for molded bunches—slightly oversize for concentrated bunches.

The bunch concentrating apparatus B includes a series of sectional concentrators which travel around in an endless path, preferably with an intermittent or step-by-step movement, so that each concentrator in turn will come to rest, first, in a receiving position with respect to the transfer mechanism D, next, in a delivery position with respect to the transfer mechanism E, and then back to its original receiving position. While passing from the receiving to the delivery position, the concentrators are kept closed so as to concentrate the bunches preparatory to the wrapping operation, but as each concentrator approaches the delivery position, it is opened automatically to permit the removal of the contained bunch and is kept open until it arrives at the receiving position to permit the insertion of a fresh bunch, after which it is again closed for the bunch concentrating operation.

In the specific embodiment illustrated (see Figs. 1 to 4 and 19 to 22), the concentrators, twelve in all, are each made up of two complementary sections 1 and 2, formed with cavities conforming to the shape and size of the concentrated bunches. The sections 1 are fixed in upright position on a hollow cylindrical turret 3, mounted to rotate about a vertical axis, while the complementary sections 2 are hinged to said turret, as at 4, so as to be swung downwardly to a horizontal position for opening the concentrators, or upwardly to a vertical position for closing the concentrators. At their lower ends, the hinged sections 2 are provided with outwardly and downwardly extending arms 5 carrying rollers 6 tracking upon a stationary continuous cam 7 supported upon a bracket 8 secured to the machine frame. In order to carry out the operations before mentioned, the cam (see particularly Figs. 8 to 12) is made to present a concentric horizontal face portion $7^a$, a concentric vertical edge portion $7^b$, and two spiral portions $7^c$ and $7^d$, the spiral portion $7^c$ merging the face portion gradually into the edge portion, and the spiral portion $7^d$ merging the edge portion gradually back into the face portion. Consequently, as the concentrators are carried around by the turret, the hinged sections 2 are caused to assume different positions with respect to the fixed sections 1 according to the portion of the cam on which they are tracking at the time. Thus, the hinged sections are maintained in a vertical or closed position while engaged with the horizontal face portion $7^a$, and in a horizontal or open position while engaged with the vertical edge portion $7^b$, the opening movement of said sections taking place as they move down the spiral portions $7^c$, and the closing movement taking place as they move up the spiral portion $7^d$. It will be seen, therefore, that the cam 7 is in constant engagement with the hinged concentrator sections and controls their position at all times, serving not only to open and close the concentrators but also to maintain them in open and closed position. This feature is very advantageous, as it greatly simplifies the construction and avoids the necessity for complicated locking devices.

It is obvious that the location or extent of the several cam portions may be variably modified without changing the principle and mode of operation involved. In the present instance, the face portion $7^a$ has been made of such extent as to maintain the concentrators in closed position throughout the greater part of their travel around the circuit. Likewise, the edge portion $7^b$ has been made of such extent as to maintain the concentrators in open position while traveling from the delivery to the receiving position, a relatively short distance. Again, the two spiral portions $7^c$ and $7^d$ have been made of such extent as to carry out the opening and closing of the concentrators slowly and gradually, in order to provide for the smooth and easy operation of the parts and to avoid any liability of displacement of the cigar bunches from the concentrators at these times.

As best shown in Fig. 8, the cam 7 is provided with a guard 7$^e$ presenting a track portion running parallel to the spiral portion 7$^c$ throughout its extent and also parallel to the face and edge portions 7$^a$ and 7$^b$ for a short distance, the idea being to provide, at this point of the cam, what in effect is a cam groove in which the roller of each hinged concentrator section is caused to engage. By this means, the hinged concentrator sections are swung downwardly in a positive manner from their vertical position as they approach the delivery point and are positively locked against upward swinging during the removal of the bunches therefrom.

The turret 3 is secured to the upper end of a vertical shaft 9 mounted in bearings 10, 10, of the supporting bracket 8. In the construction shown, the turret is keyed to the shaft 9 and is adjustable vertically thereon, a set screw 11 being employed to hold the turret in its adjusted position. At a point located between the bearings 10, 10, the shaft 9 has fixed to it a ratchet wheel 12 having as many notches 12$^a$ as there are concentrators carried by the turret. Cooperating with the ratchet wheel 12 is a vibratory crank arm 13 loosely mounted on the shaft 9 and having a spring-pressed pawl 14 provided with a roller 15 to engage the notches 12$^a$ (see Figs. 11 and 12). The pawl 14 is connected to the forward end of a rod 16 which in turn is connected by a universal joint 17 to an upright rocking lever 18 having a roller 19 running in a cam groove 20 formed in the side face of a wheel 21 on the main cam shaft 22. The shape of the cam groove 20 is such that, during each complete revolution of the shaft 22, the crank arm 13 is pushed forward to turn the ratchet wheel 12 the distance of one notch and is then returned to its original position of rest to cause the pawl roller 15 to enter the following notch in readiness for the next operation, the pawl 14 yielding outwardly against the action of its spring to permit the roller 15 to pass from one notch to the other. In this way, the intermittent or step-by-step movement of the turret is produced, it being noted that the concentrators are advanced one step at a time at each cycle of operation of the machine.

Figure 11:
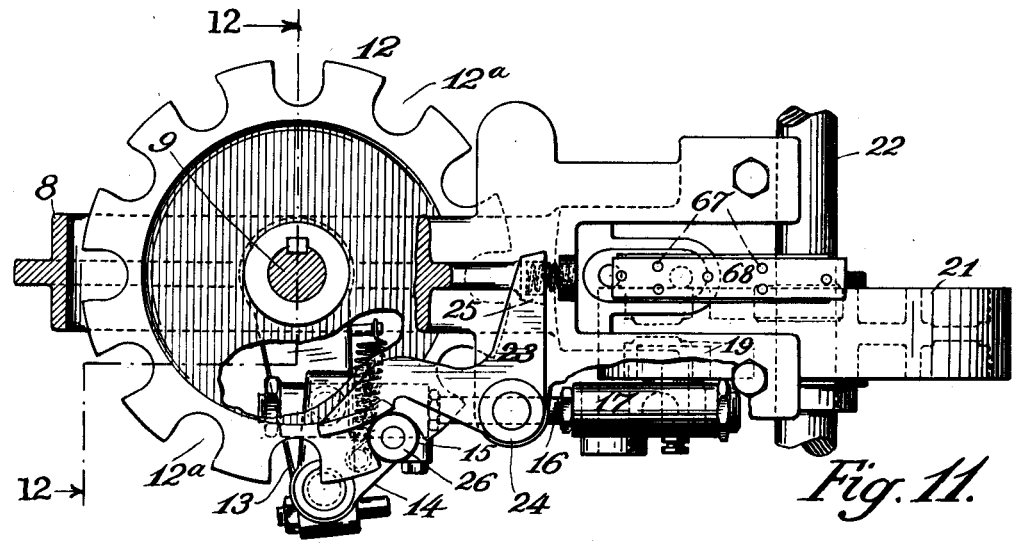
Fig. 11 is a section taken on the line 11—11 of Fig. 4.
Figure 12:
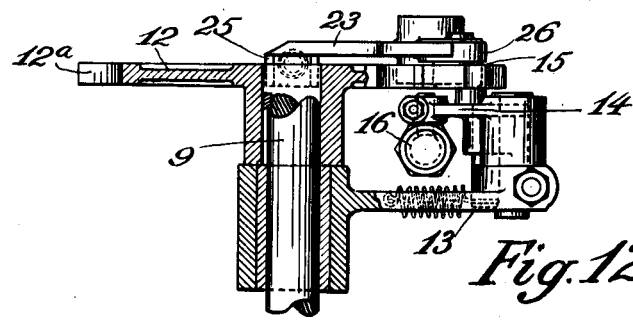
Fig. 12 is a section taken on the line 12—12 of Fig. 11.

In order to hold the ratchet wheel 12 against retrograde movement and to ensure the disengagement of the pawl roller 15 from the forward notch of the ratchet wheel during the return movement of the crank arm 13, there is provided a spring-actuated detent 23, located above the ratchet wheel and centrally pivoted, as at 24, to the supporting bracket 8 (Figs. 8 and 12). At one end, the detent is formed with a lug 25 adapted to engage in one of the notches 12$^a$, and at its opposite end, it is arranged to be engaged by a further roller 26 carried by the ratchet pawl 14. When the parts are at rest, as shown in Fig. 11, the roller 26 holds the detent in unlocking position, i. e., with its lug 25 disengaged from the ratchet wheel 12, but when the roller has been moved forward by the turning of the ratchet wheel, it passes beyond the end of the detent and allows the latter to be moved by its spring to locking position, i. e., with its lug 25 in engagement with one of the notches 12$^a$. When this occurs, the wheel is positively locked against rotation in either direction and will remain so until the pawl roller 26 reengages the detent and moves it to unlocking position.

The wrapping mechanism C may be of any well known type or construction, such as that embodied in the commercial machines, or as disclosed in the Tyberg Patent No. 1,075,172. In order to identify the parts, it is pointed out that the mechanism embodies (Fig. 1) a wrapping or rolling device proper 27, a wrapper die 28, a wrapper cutter 29, a wrapper carrier 30, the latter acting to transport the cut wrapper from the die to the wrapping device after the latter has received a bunch and a cigar trimmer 30' acting on the tuck end of the wrapped bunch or cigar. The wrapper carrier and cutter are operated in the usual way from a cam shaft 31, which, like the cam shaft 22, makes one revolution at each cycle of operation of the machine.

The transfer mechanism D, which supplies the fresh bunches to the concentrating apparatus B, from the bunch forming mechanism A, includes a reciprocatory carrier 32 provided with upper and lower pairs of grooved rollers 32$^a$ running upon corresponding formed track bars 33 fixed to a supporting bracket 34 on the machine frame (Figs. 1, 2, 2$^a$, 3, 5, 13 and 15). The carrier 32 is provided with a pair of bunch holding jaws 35 and 36 whose opposing faces are curved in a longitudinal direction to conform to the shape of the bunches, but are straight in a vertical direction to permit the subsequent ejection of the bunches. The jaw 35 is fixed to the carrier, while the jaw 36 is movable laterally thereon toward and from the fixed jaw, being attached to a pair of screw threaded rods 37 mounted in suitable bearings in the carrier with a capacity for endwise movement. The two rods 37 are threaded into the upper pair of grooved rollers 32$^a$, and these latter are provided with gear wheels 38 meshing with an overlying rack bar 39 situated alongside the upper track bar 33 (Fig. 5). When the parts are at rest, the carrier occupies a position to the right and with its two jaws separated to receive a bunch therebetween, see the full line showing in Figs. 1, 2 and 3. During the operation of the machine, however, the carrier is moved over to the left to locate the contained bunch directly above one of the downwardly swung concentrator sections 2 and comes to rest momentarily to permit the bunch to be pushed downwardly therefrom into the concentrator section, which latter is also at rest in its receiving position at the time, see the dotted lines showing in Fig. 3. During this transfer movement of the carrier, its movable jaw section is moved toward the fixed section so as to engage the bunch and give it a preliminary concentrating treatment, and for other reasons which will later appear. After the removal of the bunch, the carrier is returned to its original position and again comes to rest to receive the next bunch, the movable jaw section being moved away from the fixed section during the return movement. Any suitable means may be employed to carry out the foregoing movements of the carrier, that shown comprising a rocking lever 40 forked at its upper end to make sliding connection with the carrier and provided with a roller 41 at its lower end, the roller being engaged in a suitably shaped cam groove 42 formed in a wheel 43 fixed to a vertical shaft 44, which latter also makes one revolution at each cycle of operation of the machine.

The bunches are dislodged from the carrier and deposited in the underlying concentrator section 2 by means of a vertically movable ejector or plunger 45 slidably mounted in the supporting bracket 34 at a point directly above the receiving position of the concentrator section. The ejector is made of such size and shape as to pass between the carrier jaws 35 and 36 when the two are brought together and is formed in its under face with a cavity conforming to the shape of the bunch. Normally, the ejector occupies a raised position out of the path of movement of the carrier, but when the latter comes to rest above the concentrator section, the ejector is forced downwardly to push the bunch therefrom into the concentrator section and is then immediately restored to its raised position to permit the return of the carrier for the next bunch. Any suitable mechanism may be employed to operate the ejector in the manner described, but that shown comprises a centrally pivoted lever 46 connected by a link 47 to a further pivoted lever 48 provided with a roller 49 traveling in a second cam groove 50 formed in the wheel 43.

To trim the bunches before they are deposited in the concentrators, two different embodiments are herein illustrated. In the preferred embodiment, as best shown in Figs. 2ª, 16 and 17, the movable jaw 36 of the bunch carrier is provided with a pair of knives 51, and the ejector 45 is also provided with co-operating knives 52. Accordingly, when the ejector is forced downwardly to dislodge the bunch from the carrier, its knives 52 will first move past the trimming knives 51 of the jaw 36 and clip off the protruding ends of the contained bunch, the continued movement of the ejector effecting the dislodgment of the bunch from the carrier in the manner before indicated. In the embodiment shown in Fig. 18, the bunches are trimmed during the travel of the carrier to its delivery position. In this instance, there is a pair of trimming knives 53 located at the opposite ends of the jaws 35 and 36 and pivoted to the carrier at points thereabove, and these knives are provided with inwardly extending pins 54 which engage in slots formed in upward extensions 55 of the movable jaw 36. Consequently, when the movable jaw is moved toward the fixed jaw, the two knives, due to the pin and slot connection just described, will be caused to move across the ends of the jaws and clip off the protruding ends of the bunch, see dotted lines in Fig. 18. In this case, there is no need of providing the ejector with cutting edges, but that may be done, if desired, to insure the complete severing of the bunch ends.

The transfer mechanism E, which transports the bunches from the concentrating apparatus B to the wrapping mechanism C, includes a swinging carrier 56 attached to a vertical shaft 57 and provided with two sets of retaining devices 58 and 59, the former set for the bunches, and the latter set for the wrapped cigars. The details of the carrier and its two sets of retaining devices are well known in the art and require no further description, being practically the same as embodied in the commercial machines or as illustrated in the Tyberg Patent No. 1,075,172 before referred to. According to this invention, the carrier is operated so as to transfer the successive bunches from the traveling concentrator sections 2 to the wrapping mechanism 27, and thereafter to transfer the wrapped cigars from the wrapping mechanism to the tray or other receptacle F. Both of these functions are performed at each cycle of machine operation.

The exact mode of operation will best be understood by reference to the diagram of Fig. 1ª, which shows the carrier in its four principle positions of rest. When the machine is in operation, the carrier moves from No. 1 to No. 2 position, picking up on its way (by means of the set of retaining devices 58) a bunch which has been lifted from the concentrator section 2 then in delivery position, and pausing momentarily in No. 2 position to drop into the tray F (by means of the set of retaining devices 59) a wrapped cigar which it had previously picked up (except at the first operation) from the wrapping mechanism 27. It then moves from No. 2 position to No. 3 position, picking up (by means of the now vacant set of retaining devices 59) a wrapped cigar which has been lifted from the wrapping mechanism 27, and pausing momentarily in No. 3 position to drop into the wrapping mechanism (by means of the set of retaining devices 58) a bunch which it had previously picked up from the concentrator section. It next moves from No. 3 to No. 4 position, where it again pauses momentarily to permit the trimming and finishing of the wrapped cigar, and thereafter moves back to No. 1 position, where it first started, to complete the cycle. Any suitable mechanism may be employed for operating the carrier in the above manner, but that herein shown comprises a pinion 60 fast to a vertical shaft 57, a segmental rack 61 fixed to a second vertical shaft 62, an arm 63 also fixed to said shaft and provided with a roller 64 at its free end, and a rotary drum 65 mounted on the cam shaft 22 and having a suitably shaped cam groove 66 wherein the roller 64 engages.

The tray F, which receives the wrapped cigars as they are dropped by the swinging carrier 56, is attached to the upper end of the vertical shaft 62 so as to be swung out of the way of the hinged concentrator sections 2 as the latter approach their delivery positions. It is pointed out that the tray is located in advance of the bunch pick-up position of the carrier and at a point within easy reach of the operator attending the wrapping mechanism. This is advantageous in that the operator is enabled to inspect the cigars immediately after the wrapping operation.

It has been mentioned that the bunches are lifted from the downwardly swung concentrator sections 2 and supported above the same in position to be picked up by the carrier 56 during its transfer movement. In the present instance, this is effected by means of an ejector made up of a series of vertical pins 67 adapted to pass through openings 2ª formed in each of the hinged concentrator sections and being of different lengths and laterally spaced apart to provide at their upper ends a cavity conforming to the shape of the bunch (see Figs. 6 and 7). The pins 67 are fastened at their lower ends in a crosshead 68 clamped or otherwise adjustably secured to the upper ends of two long vertical rods 69 slidable upwardly and downwardly in suitable guideways of the machine frame. Near their lower ends, the two rods 69 have clamped thereto a block 70 which is connected by means of a link 71 to the free end of a pivoted lever 72 provided with a roller 73 traveling in a cam groove 74 formed in the wheel 21 before referred to, on the side opposite that of the cam groove 20. The shape of the groove 74 is such as normally to hold the ejector pins 67 at rest below the path of the hinged concentrator sections 2, as shown in Fig. 4. When, however, a concentrator section is located in its delivery position, the ejector pins are thrust upwardly through the openings 2ª to lift the bunch therefrom and support it well above the same, as shown in Fig. 6. The ejector pins are maintained in this raised position momentarily or until the bunch is picked up by the carrier 56, whereupon they are moved down to their original position of rest to cooperate with the next concentrator section. In other words, the ejector is operated at each step-by-step movement of the concentrator turret so as to remove the bunches from the successive concentrator sections and locate them within the range of action of the carrier. It may be stated that the upward movement of the ejector is made comparatively slow in order to avoid any displacement of the bunches, such as might result from a rapid or abrupt movement of the ejector. It is also pointed out that the form and arrangement of the ejector pins is very advantageous, in that the pins not only afford a cradle-like support for the bunches, but also enable the carrier to pick up the bunches without interference with the ejector.

Reference has already been made to the several cam shafts and to their operating connections with the various mechanisms. In the present construction, all of the cam shafts are operated from a common drive shaft 75 provided with a clutch 76 by which it may be connected to or disconnected from a continuously operating pulley 77 driven from any suitable source of power. As customary, the drive shaft 75 is connected to the cam shaft 31 of the wrapping mechanism through spiral gearing 78, and to the wrapping device proper 27 through spiral gearing 79, connecting shaft 80 and bevel gearing 81. For operating the two cam shafts 22 and 44, the drive shaft is provided with a worm 82 which meshes with two worm gears 83 and 84, the former fixed to the cam shaft 22, and the latter fixed to the cam shaft 44. In this way, the various mechanisms are all caused to operate in timed relation to one another in performing the functions before described.

It is believed that the operation of the parts will have been understood from the detailed description, but a brief recapitulation may be useful to make the sequence entirely clear, reference being had to Fig. 1 in particular. In this figure, it may be assumed that a bunch has just been placed in the carrier 32 by the operator seated at G and attending the bunch forming mechanism A. In due time, the carrier moves over to its delivery position and comes to rest above an empty concentrator section 2 located therebeneath. The ejector 45 then descends and pushes the bunch from the carrier into the concentrator section and immediately returns to its raised position, whereupon the carrier moves back to its original or receiving position to receive the next bunch. During this transfer of the bunch, its protruding ends are clipped off in the manner described, that is to say, either during the delivery movement of the carrier or during the ejection of the bunch therefrom. While the above concentrator filling operation is in progress, the ejector 67 is operated to lift a cigar bunch from the concentrator section then in delivery position and support it thereabove until picked up by the carrier 56, whereupon the ejector is moved down to clear the emptied concentrator section and to cooperate with the next concentrator section. The carrier 56 is brought into operation almost immediately after the lifting of the bunch from the concentrator section and, after dropping the wrapped cigar into the tray F and picking up another from the wrapping device 27, drops the picked up bunch into said wrapping device. Before the carrier 56 completes its cycle of operation, the turret 3 is moved one step forward to bring a filled concentrator section into delivery position and an empty concentrator section into receiving position, and the foregoing operations are repeated. It will thus be seen that all the parts are operated in perfect harmony and in such manner that a cigar is produced at each cycle of machine operation. As will be observed, the entire operation is automatic, except as to the placing of the fresh bunches in the carrier 32 which supplies them to the concentrators.

The machine is under the control of the two operators seated at G and H, such control being exercised through two foot pedals 86 and 87, respectively connected through a system of levers with the clutch 76 before referred to. The clutch is normally disengaged from the continuously operating pulley 77 and is engaged therewith only when both of the pedals are depressed at the same time. Hence, the operator attending the bunch forming mechanism A, which is under his independent control, may permit or prevent the operation of the transfer mechanism D at an improper time and avoided interruption in the supply of fresh bunches to the traveling concentrators, as well as protect himself against injury. In practice, however, there will seldom be any interruption in the operation of the machine, as the operator for the bunch forming mechanism has ample time within which to do his work.

In the foregoing machine, the cigar bunches are placed manually in the carrier 32 by the operator attending the bunch forming mechanism. This manual operation is preferred in order to obtain a more uniform product, the operator being relied upon to patch up or discard any imperfect bunches and to place the good ones in proper position in the carrier. However, in Figs. 13 to 15, there is shown an automatic arrangement by which the bunches as they are formed may be transferred from the bunch forming mechanism to the carrier. In the embodiment illustrated, the transfer device is in the form of a holder 100 arranged normally in position to receive a bunch as it is produced by the bunch forming mechanism, and adapted to be swung over to an inverted position, as shown by the dotted lines in Fig. 13, to deposit the bunch in the carrier 32. In the form shown, the holder is composed of two pairs of spring fingers shaped at their upper ends to form a pocket 101 into which the bunches are directly rolled, and shaped at their lower ends to form slots 102 for engagement with a stationary supporting rod 103. The two longer fingers are provided with an upward extension 104 adapted when the holder is in its inverted position to engage the side frame of the carrier 32, as at 105, and spread the fingers apart to permit the bunch to drop from the holder into the carrier. If desired, spring buffers 106 may be located on the holder to maintain the spring fingers in their normal gripping position. Any suitable means may be employed for operating the holder. In the construction illustrated, it is carried by a swinging arm 107 fast to a stub shaft 108 journaled in a supporting bracket 109 of the machine frame. The shaft 108 is connected by a chain and sprocket arrangement 110 with a further stub shaft 111, also journaled in the supporting bracket 109 and provided with a gear 112 meshing with a segmental rack 113 pivoted on said supporting bracket. The segmental gear is in turn connected by a link 114 to a rocking lever 115 provided with a roller 116 running in a cam groove 117 of a drum 118 fast to a vertical shaft 119 rotated through suitable connections (not shown) from the drive shaft 75. It will be understood that the shape of the cam groove 117 is such as to impart the necessary movements to the bunch holder through the connections described. In order to locate the bunches in proper position within the holder 100, there is also provided a pair of centering devices 120 which are slidably arranged upon the stationary rod 103 before referred to. These two centering devices are moved toward and from each other by means of a pair of pivoted lever 121 connected together by a link 122, and one of which is connected by a link 123 to a rocking lever 124 provided with a roller 125 running in a second cam groove 126 formed in the previously mentioned drum 118. As will be clear from the drawings, the shape of the cam groove 126 is such that the two centering devices are first moved toward each other to perform their bunch locating function and are then separated again to clear the bunch just prior to the inverting movement of the carrier. In this connection, it may be stated that the operation of the bunch forming mechanism may be left under the control of the operator seated at G or operated automatically through suitable connections from the drive shaft 75.

Under certain conditions, it may be desirable to heat the concentrators in order to dry out the bunches. Two different embodiments are herein shown for that purpose. In one embodiment, that shown in Figs. 19 and 20, a stationary electric heating unit is suspended within the turret from a cover plate 127 closing the top of the turret and supported by a suitable bracket 128 attached to the stationary cam 7. As will be noted, the turret is closed at the bottom by its base plate 3ª. The heating unit consists of a metal cylinder 129 and a wire coil 130 wound thereon, and the ends of the wire coil are connected to terminals 131 and 132 placed on the cover plate 127. If desired, a gasket 133 may be interposed between the cover plate and the turret to confine the heat within the interior chamber formed by these parts. In Figs. 21 and 22, the heating unit and cover plate are fastened directly to the turret and rotate therewith. In this case, the ends of the wire coil are connected to metal contact rings 134 attached to the turret base plate 3ª through an annular insulating block 135, the metallic rings sliding upon two stationary brushes 136 attached through insulating bushings 137 to the stationary cam 7.

The present invention is not only capable of eliminating the necessity for all the labor, machines and appliances heretofore necessary in the manufacture of "molded" cigars, but it is capable of producing much better cigars from less tobacco and at a lower cost.

What is claimed is:

1. In a cigar machine, the combination with means for concentrating a bunch to give it temporary set without closing draft passages or producing exterior ridges, of means associated with said concentrating means for immediately applying a wrapper to the concentrated bunch, and means for supplying bunches successively to said concentrating means including a sliding bunch carrier and means for transferring a bunch from said carrier to said concentrating means.

2. In a cigar machine, the combination with means for concentrating a bunch to give it temporary set without closing draft passages or producing exterior ridges, of means associated with said concentrating means for immediately applying a wrapper to the concentrated bunch, and means for supplying bunches successively to said concentrating means including a sliding bunch carrier and a plunger operative in fixed position for transferring a bunch from said carrier to said concentrating means.

3. In a cigar machine, the combination with means for concentrating a bunch to give it temporary set without closing draft passages or producing exterior ridges, of means associated with said concentrating means for immediately applying a wrapper to the concentrated bunch, and means for trimming the bunch before it is concentrated.

4. In a cigar machine, the combination with means for concentrating a bunch to give it temporary set without closing draft passages or producing exterior ridges, of means associated with said concentrating means for immediately applying a wrapper to the concentrated bunch, means for supplying bunches successively to said concentrating means including a sliding bunch carrier and means for transferring a bunch from said carrier to said concentrating means, and means coacting with said bunch carrier for trimming a bunch therein.

5. In a cigar machine, the combination with means for concentrating a bunch to give it temporary set without closing draft passages or producing exterior ridges, of means associated with said concentrating means for immediately applying a wrapper to the concentrated bunch, means associated with said concentrating means for enclosing a sufficient quantity of filler in a binder to produce a slightly oversized bunch to be concentrated, and means whereby bunches are presented for inspection between said enclosing and said concentrating means.

6. In a cigar machine, the combination with means for enclosing a sufficient quantity of filler in a binder to produce a slightly oversized bunch, of means associated with said enclosing means and acting on said bunch to concentrate it sufficiently to reduce it to proper size and to give it temporary set but insufficiently to close draft passages or to produce exterior ridges, and bunch trimming means interposed between said enclosing means and said concentrating means.

7. In a cigar machine, the combination with a wrapping mechanism, of a series of traveling upright bunch concentrators each having a hinged section adapted to be swung downwardly to a horizontal position at one point in the travel of the concentrators, an ejector operating through the successive downwardly swung sections to lift the bunches therefrom and support them thereabove, and a carrier to receive the lifted bunches and transport them to the wrapping mechanism.

8. In a cigar machine, the combination with a rotatable turret equipped with a series of fixed concentrator sections and a corresponding series of complementary hinged concentrator sections, means for imparting an intermittent rotation to the turret, means for opening the concentrators at one point in their travel, an ejector to remove the bunches from the concentrators as they are successively opened, a wrapping mechanism, and a carrier to receive the bunches as they are ejected from the successive concentrators and transport them to the wrapping mechanism.

9. In a cigar machine, the combination with a rotatable turret equipped with a series of fixed concentrator sections and a corresponding series of complementary hinged concentrator sections, means for imparting an intermittent rotation to the turret, means for opening the concentrators at one point in their travel, an ejector to remove the bunches from the concentrators as they are successively opened, a wrapping mechanism, a carrier having two sets of retaining devices, one to receive the bunches as they are ejected from the successive concentrators, and the other to receive the wrapped cigars from the wrapping mechanism, a cigar receptacle, and means for moving the carrier between the traveling concentrators and the wrapping mechanism and between the latter and the receptacle.

10. In a cigar machine, the combination with an endless traveling conveyor provided with a plurality of bunch concentrators, of a wrapping mechanism, an ejector to remove the bunches from the successive concentrators, and a carrier to receive the ejected bunches and transport them directly to the wrapping mechanism.

11. In a cigar machine, the combination with an endless traveling conveyor provided with a plurality of bunch concentrators, of a wrapping mechanism, an ejector to remove the bunches from the successive concentrators, a carrier having two sets of retaining devices, one for bunches and the other for cigars, and means for moving the carrier between the concentrator conveyor and the wrapping mechanism and between the latter and a suitable delivery point.

12. In a cigar machine, the combination with a bunch forming mechanism, of a wrapping mechanism, and an intermediate bunch concentrating apparatus, means independent of the bunch forming mechanism for supplying bunches to the concentrating apparatus, and a carrier for transporting the bunches directly from the concentrating apparatus to the wrapping mechanism.

13. In a cigar machine, the combination with a bunch forming mechanism, of a wrapping mechanism, and an intermediate series of traveling upright bunch concentrators each having a hinged section adapted to be swung downwardly to a horizontal position at one point in the travel of the concentrators, of an ejector operating through the successive downwardly swung concentrator sections to lift the bunches therefrom and support them thereabove, a carrier to receive the ejected bunches and transfer them to the wrapping mechanism, and a second carrier to transfer the bunches from the bunch forming mechanism to the emptied bunch concentrator sections.

14. In a cigar machine, the combination with a bunch forming mechanism, of a bunch concentrating apparatus, a wrapping mechanism, means for transporting the bunches from the concentrating apparatus to the wrapping mechanism, a carrier operating between the concentrating apparatus and the bunch forming mechanism, and a transfer holder acting to receive the bunches directly from the bunch forming mechanism and deposit them in the carrier.

15. In a cigar machine, the combination with a bunch forming mechanism, of a wrapping mechanism, and an intermediate series of traveling upright bunch concentrators each having a hinged section adapted to be swung downwardly to a horizontal position at one point in the travel of the concentrators, means for transferring the bunches successively from the downwardly swung concentrator sections to the wrapping mechanism, means for supplying bunches to the emptied concentrator sections from the bunch forming mechanism, the latter means including a carrier movable back and forth between the concentrator sections and the bunch forming mechanism, and a transfer holder movable back and forth between the carrier and the bunch forming mechanism.

16. In a cigar machine, the combination with a bunch concentrating apparatus embodying a cylindrical turret rotatable about a vertical axis, a series of upright concentrator sections fixed to said turret, a corresponding series of complementary concentrator sections hinged to the turret so as to be swung downwardly to a horizontal position for opening the concentrators and upwardly to a vertical position for closing the concentrators, and means cooperating with the hinged sections to control the position thereof during the rotation of the turret, a wrapping mechanism, means to transfer the bunches from the successive concentrators to the wrapping mechanism and the wrapped cigars from the wrapping mechanism to a point located within easy reach of the operator, a cigar receptacle located at such point, and means for moving the receptacle out of the way when the hinged sections are swung downwardly to open the concentrators.

17. A cigar bunch concentrating apparatus embodying a series of concentrators each having a movable section, means for carrying the concentrators around in an endless path, and means arranged in constant engagement with the movable concentrator sections to control their position during the travel of the concentrators around the circuit.

18. A cigar bunch concentrating apparatus embodying a series of concentrators each having a movable section, means for carrying the concentrators around in an endless path, and a stationary continuous cam cooperating with the movable concentrator sections to control their position during the travel of the concentrators around the circuit.

19. A cigar bunch concentrating apparatus embodying a cylindrical turret rotatable about a vertical axis, a series of upright concentrator sections fixed to said turret, a corresponding series of complementary concentrator sections hinged to the turret so as to be swung downwardly to a horizontal position for opening the concentrators and upwardly to a vertical position for closing the concentrators, and means cooperating with the movable concentrator sections to control the opening and closing of the concentrators at different points in their travel around the circuit, the said means acting also to maintain the concentrators in open condition during their travel from the opening to the closing point and in closed condition during their travel from the closing to the opening point.

20. A cigar bunch concentrating apparatus embodying a cylindrical turret rotatable about a vertical axis, a series of upright concentrator sections fixed to said turret, a corresponding series of complementary concentrator sections hinged to the turret so as to be swung downwardly to a horizontal position for opening the concentrators and upwardly to a vertical position for closing the concentrators, and means arranged in constant engagement with the movable concentrator sections to control their position during the travel of the concentrators around the circuit.

21. A cigar bunch concentrating apparatus embodying a cylindrical turret rotatable about a vertical axis, a series of upright concentrator sections fixed to said turret, a corresponding series of complementary concentrator sections hinged to the turret so as to be swung downwardly to a horizontal position for opening the concentrators and upwardly to a vertical position for closing the concentrators, and a stationary continuous cam cooperating with the movable concentrator sections to control their position during the travel of the concentrators around the circuit.

22. A cigar bunch concentrating apparatus embodying a cylindrical turret rotatable about a vertical axis, a series of upright concentrator sections fixed to said turret, a corresponding series of complementary concentrator sections hinged to the turret so as to be swung downwardly to a horizontal position for opening the concentrators and upwardly to a vertical position for closing the concentrators, and a stationary continuous cam cooperating with the hinged concentrator sections during the rotation of the turret, the said cam presenting a horizontal face portion, a vertical edge portion, and two spiral portions merging the face and edge portions one into the other.

23. A cigar bunch concentrating apparatus embodying a cylindrical turret rotatable about a vertical axis, a series of upright concentrator sections fixed to said turret, a corresponding series of complementary concentrator sections hinged to the turret so as to be swung downwardly to a horizontal position for opening the concentrators and upwardly to a vertical position for closing the concentrators, a stationary continuous cam cooperating with the hinged concentrator sections during the rotation of the turret, and means for adjusting the turret and cam, one relatively to the other, to insure the proper cooperation between the cam and the concentrator sections.

24. A cigar bunch concentrating apparatus embodying a cylindrical turret rotatable about a vertical axis, a series of upright concentrator sections fixed to said turret, a corresponding series of complementary concentrator sections hinged to the turret so as to be swung downwardly to a horizontal position for opening the concentrators and upwardly to a vertical position for closing the concentrators, and a stationary continuous cam cooperating with the hinged concentrator sections during the rotation of the turret, the said cam presenting a horizontal face portion, a vertical edge portion, and two spiral portions merging the face and edge portions one into the other, and a guard presenting a track portion extending parallel to one of the spiral portions and slightly beyond the same at its opposite ends, for the purpose described.

25. The combination with a series of sectional bunch concentrators, of means for producing a traveling movement of said concentrators, means for separating the concentrator sections at one point in their travel, and means for ejecting the bunches from the concentrators in the separated condition of the latter, the said means including a series of pins adapted to enter each concentrator through apertures formed in one of the sections thereof, and the said pins being arranged to provide a cavity conforming to the shape of the bunches.

26. The combination with a series of traveling bunch concentrators each having an apertured section adapted to occupy a horizontal position at one point in the travel of the concentrators, and means for ejecting the bunch from each such section when in that position, the said means comprising a series of lifting pins adapted to pass upwardly through said apertured section and support the bunch thereabove.

27. The combination with a series of traveling bunch concentrators each comprising an apertured section adapted to occupy a horizontal position at one point in the travel of the concentrators, and means for ejecting the bunch from each such section when in that position, the said means comprising a series of lifting pins adapted to pass upwardly through said apertured section and support the bunch thereabove, and the said pins being arranged to provide a cavity conforming to the shape of the bunch.

28. The combination with a series of traveling sectional concentrators, of means for supplying bunches thereto, the said means including a sliding carrier comprising a pair of jaws movable toward and away from each other, and means actuated by the motion of the carrier for effecting the to and fro movement of its jaws.

29. The combination with a series of traveling sectional concentrators, of means for supplying bunches thereto, the said means including a sliding carrier comprising a pair of jaws movable toward and away from each other, and positively actuated means for moving the jaws toward and away from each other.

30. The combination with a series of traveling sectional concentrators, of means for supplying bunches thereto, the said means including a sliding carrier comprising a pair of jaws, one fixed and the other movable, and screw-threaded means actuated by the motion of the carrier for effecting the relative movement of the two jaws.

31. The combination with a series of traveling concentrators each having a hinged section adapted to be swung downwardly to a horizontal position at one point in the travel of the concentrators, of a carrier adapted to be positioned above each such section when in that position, an ejector for pushing the bunch downwardly from the carrier into the concentrator section, and means for trimming the bunch during its transfer from the carrier to the concentrator section.

32. The combination with a series of traveling concentrators each having a section adapted to be swung downwardly to a horizontal position at one point in the travel of the concentrators, a carrier adapted to be positioned above each such section when in that position, an ejector for pushing the bunch downwardly from the carrier into the concentrator section, and a pair of trimming knives attached to the opposite ends of the carrier and acting to cut off the ends of the bunch before it enters the concentrator section.

33. The combination with a series of traveling concentrators each having a movable section adapted to occupy a horizontal position at one point in the travel of the concentrators, of a reciprocatory carrier adapted to be positioned above each such section when in that position, an ejector for pushing the bunch downwardly from the carrier into the concentrator section, a pair of trimming knives attached to the opposite ends of the carrier, and a cooperating pair of trimming knives on the opposite ends of the ejector.

34. The combination with a series of traveling concentrators each having a movable section adapted to occupy a horizontal position at one point in the travel of the concentrators, of a reciprocatory carrier adapted to be positioned above each such section when in that position, and a pair of trimming knives mounted on the carrier and operated by the movement thereof for cutting off the ends of the contained bunch.

35. In a cigar machine, the combination with means for concentrating a bunch to give it temporary set without closing draft passages or producing exterior ridges, of means associated with said concentrating means for applying a wrapper to the concentrated bunch, and a sliding carrier operating to supply bunches successively to said concentrating means, said carrier including mechanism for imparting a preliminary concentrating treatment to a bunch carried by the carrier previous to delivery of the bunch to said concentrating means.

36. In a cigar machine, the combination with means for concentrating a bunch to give it temporary set without closing draft passages or producing exterior ridges, of means associated with said concentrating means for applying a wrapper to the concentrated bunch, and a sliding carrier operating to supply bunches successively to said concentrating means, said carrier including mechanism for imparting a preliminary shape to a bunch carried by the carrier previous to the delivery of the bunch to said concentrating means.

37. In a cigar machine, the combination with means for concentrating a bunch to give it temporary set without closing draft passages or producing exterior ridges, of means associated with said concentrating means for applying a wrapper to the concentrated bunch, a sliding carrier operating to supply bunches successively to said concentrating means, said carrier including mechanism for imparting a preliminary concentrating treatment to a bunch carried by the carrier previous to delivery of the bunch to said concentrating means, and said carrier mechanism also operating to impart a preliminary shape to the bunch carried by the carrier, and means for transferring a bunch from said carrier to said concentrating means.

38. In a cigar machine, the combination with means for concentrating a bunch to give it temporary set without closing draft passages or producing exterior ridges, of means associated with said concentrating means for applying a wrapper to the concentrated bunch, a sliding carrier operating to supply bunches successively to said concentrating means, coacting jaws mounted on the carrier to engage a bunch, mechanism controlled by the movement of the carrier operating to actuate the jaws to engage a bunch placed between the jaws, and means for transferring a bunch from the jaws to said concentrating means.

39. In a cigar machine, the combination with means for concentrating a bunch to give it temporary set without closing draft passages or producing exterior ridges, of means associated with said concentrating means for applying a wrapper to the concentrated bunches, a sliding carrier operating to supply bunches successively to said concentrating means, coacting jaws mounted on the carrier to engage a bunch, the engaging faces of the jaws having a contour to fit the longitudinal shape of an engaged bunch, mechanism controlled by the movement of the carrier for gradually moving the jaws together to compact slightly an engaged bunch, and means for transferring a bunch from the jaws to said concentrating means.

40. In a cigar machine, a transfer mechanism for the bunches comprising a support including track bars, a carrier having rollers to travel on the track bars, coacting jaws mounted on the carrier and operative to engage a bunch, a rod connected with one of the jaws and threaded in one of the rollers so that rotation of the roller effects relative movement of the jaws to open and close the same during the travel of the carrier back and forth on the support.

41. In a cigar machine, a transfer mechanism for the bunches comprising a support including track bars, a carrier having rollers to travel on the track bars, a gear concentrically fixed to one of the rollers, a rack fixed to the support and extending in the direction of travel of the carrier, said rack meshing with said gear to impart positive rotation to the roller fixed to the gear as the carrier travels, coacting jaws mounted on the carrier and operative to engage a bunch, a rod connected with one of the jaws and threaded with one of the jaws so that rotation of the geared roller effects relative movement of the jaws to open and to close the same during the travel of the carrier back and forth on the support.

42. In a cigar machine, the combination with a bunch forming mechanism, of a main bunch concentrating apparatus, transferring means for transferring bunches from the bunch forming mechanism to the main concentrating apparatus, and an auxiliary bunch concentrating means included in the transferring means for imparting a preliminary compacting treatment to a bunch being carried by the transferring means.

43. In a cigar machine, the combination with a bunch forming mechanism, of a main bunch concentrating apparatus, a reciprocative carrier for transferring bunches from the bunch forming mechanism to the main concentrating apparatus, and an auxiliary bunch concentrating means mounted on the carrier and operating to impart a preliminary compacting treatment to a bunch being carried by the carrier.

44. In a cigar machine, the combination with a bunch forming mechanism, of a concentrating means comprising a cylindrical turret rotatable about a vertical axis, a series of upright concentrator sections fixed to said turret, a corresponding series of complementary concentrator sections hinged to the turret so as to be swung downwardly to a horizontal position for opening the concentrators and upwardly to vertical position for closing the concentrators, and means cooperating with the hinged concentrator sections to control their position during the rotation of the turret; a transfer mechanism for the bunches including a guideway between the bunch forming mechanism and the concentrating means, and a carrier slidable on the guideway and operable to transmit a bunch from the forming mechanism to a position above a horizontally disposed concentrator section; and an ejector for pushing the engaged bunch downwardly from the carrier into the horizontal concentrator section positioned beneath the carrier.

45. In a cigar machine, the combination with a bunch forming mechanism, of a concentrating means comprising a cylindrical turret rotatable about a vertical axis, a series of upright concentrator sections fixed to said turret, a corresponding series of complementary concentrator sections hinged to the turret so as to be swung downwardly to a horizontal position for opening the concentrators and upwardly to a vertical position for closing the concentrators, and means cooperating with the hinged concentrator sections to control their position during the rotation of the turret; a transfer mechanism for the bunches including a guideway between the bunch forming mechanism and the concentrating means, a carrier slidable on the guideways, coacting jaws mounted on the carrier and operative to engage a bunch from the forming mechanism, means controlled by the movement of the carrier operating to actuate the jaws to engage a bunch placed between the jaws; said carrier operating to position the jaws engaging a bunch over a horizontally disposed concentrator section; and an ejector for pushing the engaged bunch downwardly from the jaws into the horizontal concentrator section positioned beneath the carrier.

46. A cigar bunch concentrating apparatus embodying a series of concentrators each having a movable section, means for carrying the concentrators around in an endless path, and mechanism arranged in constant engagement with the movable concentrator sections to control continuously the opening and closing of the concentrators at different points in their travel around the circuit, the said mechanism operating to maintain the concentrators in open condition during their travel from the opening to the closing point and in closed condition during their travel from the closing to the opening point.

47. A cigar bunch concentrating apparatus embodying a cylindrical turret rotatable about a vertical axis, a series of upright concentrator sections fixed to said turret, a corresponding series of complementary concentrator sections hinged to the turret so as to be swung downwardly to a horizontal position for opening the concentrators and upwardly to a vertical position for closing the concentrators, and mechanism arranged in constant engagement with the movable concentrator sections to maintain the concentrators in closed condition throughout a portion of their travel around the circuit, the said mechanism acting also to control the opening and closing of the concentrators at different periods in the remaining portion of their travel around the circuit.

In testimony whereof, I have signed my name to this specification.

GEORGE H. SNYDER.